United States Patent Office 3,395,139
Patented July 30, 1968

3,395,139
LINCOMYCIN S AND PROCESS FOR
PRODUCING THE SAME
Donald J. Mason, Portage, and Alexander D. Argoudelis,
Kalamazoo, Mich., assignors to The Upjohn Company,
Kalamazoo, Mich., a corporation of Delaware
No Drawing. Filed June 17, 1966, Ser. No. 558,274
9 Claims. (Cl. 260—210)

ABSTRACT OF THE DISCLOSURE

Antibiotic lincomycin S of the formula:

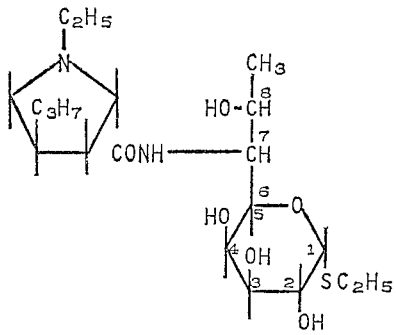

and a process for the production thereof. Lincomycin S is useful as an antibacterial agent against gram-positive and gram-negative microorganisms.

---

This invention relates to a novel composition of matter and to a process for the production thereof. More particularly, this invention relates to a new compound, N-demethyl-N-ethyllincomycin C, also called lincomycin S (U–25,468), and to a process for the production thereof.

Lincomycin S is an organic compound producible by culturing a lincomycin-producing actinomycete in an aqueous nutrient medium in the presence of added ethionine under aerobic conditions. Lincomycin S has the following structural formula:

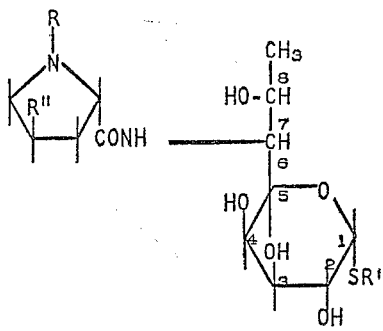

wherein R and R' are ethyl and R'' is n-propyl.

Lincomycin S is a basic compound which has the property of adversely affecting the growth of gram-positive and gram-negative bacteria, for example, Staphylococcus aureus, Bacillus subtilis, Streptococcus faecalis, Streptococcus hemolyticus, Escherichia coli, Klebsiella pneumoniae, and Salmonella schottmuelleri. Accordingly, lincomycin S can be used alone or in combination with other antibiotic agents to prevent the growth of, or reduce the number of bacteria, as disclosed above, in various environments. For example, it can be used as a disinfectant on various dental and medical equipment contaminated with Staphylococcus aureus. It is also useful in wash solutions for sanitation purposes, as in the washing of hands, and the cleaning of equipment, floors, or furnishings of contaminated rooms or laboratories; it is also useful as an industrial preservative, for example, as a bacteriostatic rinse for laundered clothes and for impregnating paper and fabrics; and it is useful for suppressing the growth of sensitive organisms in plate assays and other microbiological media.

The actinomycete used according to this invention for the production of lincomycin S is Streptomyces lincolnensis var. lincolnensis. This is a well-known actinomycete which is on deposit in the permanent collection of the Northern Utilization and Research Division, Agricultural Research Service, U.S. Department of Agriculture, Peoria, Ill. Its accession number in this repository is NRRL 2936.

Lincomycin S is structurally related to the antibiotics lincomycin, lincomycin B (U–21,699) and lincomycin C (U–11,921). Referring to Formula I, the structures are as follows:

|  | R | R' | R'' |
|---|---|---|---|
| Lincomycin | $CH_3$ | $CH_3$ | $C_3H_7$ |
| Lincomycin B | $CH_3$ | $CH_3$ | $C_2H_5$ |
| Lincomycin C | $CH_3$ | $C_2H_5$ | $C_3H_7$ |
| Lincomycin S | $C_2H_5$ | $C_2H_5$ | $C_3H_7$ |

Lincomycin S, though structurally related to lincomycin, lincomycin B and lincomycin C, is a distinctly different antibiotic possessing unexpected antibacterial properties. Lincomycin, lincomycin B and lincomycin C are antibacterially active against gram-positive organisms, whereas lincomycin S is active not only against gram-positive organisms, but also against gram-negative organisms. The following Table I shows the comparison of lincomycin and lincomycin S against common gram-positive and gram-negative organisms:

TABLE I

| Test Organisms | Minimum Inhibitory Concentration in Mcg./Ml. | |
|---|---|---|
|  | Lincomycin | Lincomycin S |
| S. aureus | 0.8 | 0.4 |
| Streptococcus hemotylicus | 0.4 | 0.4 |
| Streptococcus faecalis | 0.4 | 0.4 |
| E. coli | >200 | 50 |
| K. pneumoniae | 50 | 12.5 |
| S. schottmuelleri | >200 | 50 |

It has now been found that when ethionine is added to a fermentation using the microorganism Streptomyces lincolnensis var. lincolnensis, not only is lincomycin C and some lincomycin and lincomycin B produced, but, also, lincomycin S is produced. Until our discovery, the customary and usual procedures for the isolation of lincomycin, lincomycin B and lincomycin C from culture broth containing the same have destroyed, or prevented the isolation and recognition of lincomycin S. In working up such broths, the lincomycin, lincomycin B and licomycin C were isolated, and the residues discarded. Thus, even though lincomycin S was formed as a concomitant to lincomycin, lincomycin B, and lincomycin C, it was not known, recognized, or recovered in a usable and recognizable form prior to this invention. By the process of this invention we are now able to isolate, separate, and recover lincomycin S free of lincomycin, lincomycin B, lincomycin C and like concomitants.

Though licomycin S can be produced in a fermentation as described in Example 1 of U.S. Patent 3,086,912 when ethionine is added, the production of lincomycin S in this fermentation is not sufficient to be effectively recovered. A preferred medium for the production of lincomycin S is a synthetic fermentation medium, as shown in Example 1, to which ethionine is added. The carbon source in this medium is glucose monohydrate and the nitrogen source is ammonium nitrate. Trace metals such as zinc, iron, and magnesium are added to the medium. Though the preferred medium presently produces the highest amount of recoverable lincomycin S, it is recognized that medium variations can be carried out in a manner well known to those skilled in the art so that other carbon and nitrogen sources can be used. Such other carbon sources can be brown sugar, sucrose, glycerol, starch, cornstarch, galactose, dextrin, molasses, and the like. Other nitrogen sources can be corn steep liquor, yeast, autolyzed brewer's yeast with no solids, soybean meal, cottonseed meal, corn meal, milk solids, pancreatic digest of casein, distiller's solubles, fish meal, animal peptone liquors, meat and bone scraps and the like.

Production of lincomycin S can be effected at any temperature conducive to satisfactory growth of the microorganism, for example, between about 18° and 40° C. and preferably between about 25° and 30° C. Ordinarily, optimum production of the compound is obtained in about 2 to 10 days. The medium normally stays fairly close to neutral, or on the basic side during the fermentation. The final pH is dependent, in part, on the buffers present, if any, and in part on the initial pH of the culture medium which is advantageously adjusted to about pH 6–8 prior to sterilization.

When growth is carried out in large vessels and tanks, it is preferable to use the vegetative form, rather than the spore form, of the microorganism for inoculation to avoid a pronounced lag in the production of the new compound and the attendant inefficient utilization of equipment. Accordingly, it is desirable to produce a vegetative inoculum in a nutrient broth culture by inoculating the broth culture with an aliquot from a soil or slant culture. When a young active vegetative inoculum has thus been secured, it is transferred aseptically to large vessels or tanks. The medium in which the vegetative inoculum is produced can be the same as, or different from, that utilized for the production of the new compound, as long as it is such that a good growth of the microorganism is obtained.

In a preferred fermentation for lincomycin S, approximately 500 mg./liter of ethionine is added to the fermentation at the end of 72 hours. Any higher or lower amount, say from about 0.5 mg./ml. to about 4 mg./ml., which is effective to produce lincomycin S can be used. The fermentation is then harvested at 6 days. Either DL-ethionine or L-ethionine can be used, but the addition of L-ethionine results in more effective production of lincomycin S. Whichever ethionine is used, there may be present a certain amount of toxicity to the growth of the microorganism which may reduce the ultimate yield of lincomycin S in the fermentation. This toxicity can be minimized by feeding the ethionine to the fermentation when it is about 48 to 72 hours old. The feeding can be done continuously, semicontinously, or by other means as long as the concentration of ethionine in the fermentation does not affect the growth of the microorganism to the point where the production of lincomycin suffers.

A variety of procedures can be employed in the isolation and purification of lincomycin S, for example, solvent extraction, liquid-liquid distribution in a Craig apparatus, the use of adsorbents, and crystallization from solvents. In a preferred process, the whole beer from a lincomycin S fermentation is filtered using a filter aid, for example, diatomaceous earth, as required. The filtrate is then adjusted to an alkaline pH of about 10.0 and extracted with a water-immiscible solvent. Methylene chloride is preferred. The solvent extract is concentrated to dryness to yield a crude dry preparation containing lincomycin, lincomycin B, lincomycin C, and lincomycin S. Lincomycin S can be separated from these other lincomycins by column chromatography using solvent systems in which lincomycin S is soluble to elute lincomycin S from the column. In a preferred method, a crude preparation containing lincomycin S and other lincomycins is passed over a silica gel chromatography column. The column is eluted with a solvent system consisting of methyl ethyl ketone:acetone:water in the proportions 100:30:5. Lincomycin S is eluted first from such a column. Thus, the column can be eluted, and fractions collected and analyzed by thin-layer chromatography to detect the presence of lincomycin S. The thin-layer chromatography is conducted on Silica gel G (E. Merck A.G. Darmstadt) plates of 0.12 to 0.5 mm. in thickness using methyl ethyl ketone:acetone:water (140:40:22 v./v.) as the eluting solvent. Fractions containing lincomycin S only can be pooled for further processing. Fractions containing lincomycin S and other lincomycins can be pooled and passed through the column a second time. Where fractions contain lincomycin S and other lincomycins, it is advantageous to "enrich" these fractions in lincomycin S content by subjecting them to counter current distribution in a Craig apparatus using a solvent system consisting of equal volumes of 1-butanol and water. These enriched fractions from the counter current distribution then can be passed over a chromatography column as described above.

Alternatively, crude preparations of lincomycin S which contain other lincomycins can be subjected to counter current distribution in a Craig apparatus, as disclosed above, before the first passage over a chromatography column. This procedure is advantageously employed where a crude preparation of lincomycin S contains a relatively high quantity of other lincomycins.

Though silica gel chromatography is the preferred chromatography for isolating lincomycin S from materials containing lincomycin S and other lincomycins, it is within the ambit of this invention that other chromatography procedures, such as partition chromatography and adsorption chromatography can be used.

Crystallization, as well as recrystallization of lincomycin S hydrochloride is accomplished by dissolving an antibiotic preparation consisting of lincomycin S hydrochloride in water, adding a water-miscible solvent, e.g., acetone, methanol, ethanol, or 2-propanol, and then cooling to induce or complete the crystallization. The crystals are filtered and washed with aqueous solvent, and, if desired, by anhydrous solvent and then vacuum dried.

The new compound of the invention also can be recovered from the filtered beer by adsorption on cation exchange resins. But the carboxylic and sulfonic acid types can be used. [Suitable carboxylic acid resins include the polyacrylic acid resins obtained by the copolymerization of acrylic acid and divinylbenzene by the procedure given on p. 87 of Kunin, Ion Exchange Resins, 2nd Edition (1958), John Wiley and Sons, Inc. Carboxylic acid cation exchange resins of this type are marketed under the tradenames Amberlite IRC–50 and Zeokarb 226. Suitable sulfonic acid resins include nuclear sulfonated polystyrene resins cross-linked with divinylbenzene which are obtained by the procedure given on p. 84 of Kunin, supra. Sulfonated cation exchange resins of this type are marketed under the trade-names Dowex–50, Amberlite IR–120, Nalcite HCR, Chempro C–20, Permutit Q, and Zeokarb 225.]

The antibiotic is eluted from the resin with an acid, advantageously at a pH lower than the pKa of the cation exchange resin used. Satisfactory results are obtained with a pH of about 1 to 6. The eluate is adjusted to pH 7.5 to 8.5 with a base, e.g., sodium hydroxide, or a strongly basic anion exchange resin. The eluates can be purified further by chromatography column and counter current distribution procedures as disclosed above. [Suitable anion exchange resins for this purpose are obtained by chloromethylating by the procedure given on pp. 88 and 97 of kunin, supra, polystyrene crosslinked, if desired, with divinylbenzene, prepared by the procedure given on p. 84 of kunin, supra, and quaternizing with trimethylamine or dimethylethanolamine by the procedure given on p. 97 of Kunin, supra. Anion exchange resins of this type are marketed under the trade-names Dowex–2, Dowex–20, Amberlite IRA–400, Duolite A–102, and Permutit S–1.]

Various acid addition salts of lincomycin S can be made by neutralizing the free base with the appropriate acid to below about pH 7.0, and advantageously to about pH 2 to pH 6. Suitable acids for this purpose include hydrochloric, sulfuric, phosphoric, acetic, succinic, citric, lactic, maleic, fumaric, pamoic, cholic, palmitic, mucic, camphoric glutaric, glycolic, phthalic, tartaric, lauric, stearic, salicylic, 3-phenylsalicylic, 5-phenylsalicylic, 3-methylglutaric, orthosulfobenzoic, cyclohexanesulfamic, cyclopentanepropionic, 1,2-cyclohexanedicarboxylic, 4-cyclohexenecarboxylic, octadecenylsuccinic, octenylsuccinic, methanesulfonic, benzenesulfonic, helianthic, Reinecke's, dimethyldithiocarbamic, sorbic, monochloroacetic, undecylenic, 4'-hydroxyazobenzene - 4 - sulfonic, octadecylsulfuric, picric, benzoic, cinnamic, and like acids.

Salts of lincomycin S can be used for the same biological purposes as the free base or they can be employed to upgrade the antibiotic by successive transfers of the antibiotic from protonated to non-protonated forms and vice versa, especially with other types of treatments intervening, for example, solvent extractions and washings, chromatography and fractional liquid-liquid extractions. For example, the antibiotic can be converted to an insoluble salt, such as the picrate which can be subjected to purification procedures and then used to regenerate the antibiotic free base by treatment with alkali. Or the antibiotic can be converted to a water-soluble salt such as the hydrochloride or sulfate, and the aqueous solution of the salt extracted with various water-immiscible solvents before regenerating the antibiotic free base by treatment with alkali of the thus-extracted acid solution.

Lincomycin S can be used to control *S. aureus* on washed and stacked food utensile. It also can be used as a disinfectant on various dental and medical equipment contaminated with *S. aureus*. Lincomycin S is active against *Bacillus subtilis* and can be used for treating breeding places of silkworms to prevent or minimize infections caused by this organism. It also can be used to minimize or prevent odor caused by this organism in fish and fish crates.

The following examples are illustrative of the process and products of the present invention, but are not to be construed as limiting. All percentages are by weight and all solvent mixtures are by volume unless otherwise noted.

EXAMPLE 1.—LINCOMYCIN S

*Fermentation*

A soil slant of *Streptomyces lincolnensis* var. *lincolnensis*, NRLL 2936, is used to inoculate a series of 500-ml. Erlenmeyer flasks each containing 100 ml. of seed medium consisting of the following ingredients:

|  | G. |
|---|---|
| Yeastolac [1] | 10 |
| Glucose monohydrate | 10 |
| N-Z-Amine B [2] | 5 |
| Tap water, q.s., 1 liter. | |

[1] Yeastolac is a protein hydrolysate of yeast cells.
[2] N-Z-Amine B is Sheffield's Enzymatic Digest of Casein.

The seed medium post-sterilization pH is about 7.3. The seed is grown for 2 days at 28° C. on a Gump rotary shaker operating at 250 r.p.m. with a 2½ inch stroke.

A 5% inoculum of the seed described above (5 ml.) is added to each of a series of 500-ml. Erlenmeyer flasks each containing 100 ml. of the following fermentation medium.

|  | G./liter |
|---|---|
| Glucose monohydrate | 30 |
| Sodium citrate | 3 |
| $ZnSO_4 \cdot 7H_2O$ | 0.001 |
| $FeSO_4 \cdot 7H_2O$ | 0.001 |
| $MgSO_4$ | 1 |
| $K_2HPO_4$ | 2.5 |
| NaCl | 0.5 |
| $NH_4NO_3$ | 2.0 |
| Deionized water, q.s., 1 liter. | |

The glucose monohydrate and sodium citrate are sterilized separately from the salts. The fermentation medium post-sterilization pH ranges from 7.3 to 7.8. The inoculated fermentation flasks are placed on a Gump rotary shaker operating at 250 r.p.m. with a 2½ inch stroke. The shaker is in an incubator room maintained at a temperature of 28° C. After 72 hours of fermentation time, 500 mg./liter DL-ethionine is added aseptically to the fermentation flasks. The fermentation flasks are harvested at 6 days.

In a similar manner, fermentations can be run with L-ethionine substituted for DL-ethionine.

*Recovery*

Whole beer from a lincomycin S fermentation as described above is filtered at harvest pH using a filter aid, e.g., diatomaceous earth, as required. The mycelial cake is washed with water and the cake is then discarded. The combined filtered beer and water wash is adjusted to a pH of 10.0 with a 50% solution of sodium hydroxide, and then extracted three times with one-quarter volume each time of methylene chloride. The methylene chloride extracts are combined and concentrated to an oil.

*Chromatography purification*

An oil preparation containing lincomycin S, as disclosed above, is dissolved in methanolic hydrogen chloride at a pH of about 2.0. Upon the addition of this solution to ether, a precipitate forms. This precipitate, which consists of lincomycin, lincomycin B, lincomycin C and lincomycin S is isolated by filtration. This preparation is then added to a silica gel chromatography column which is prepared as follows:

Silica gel (Merck-Darmstadt No. 7734, 0.05–0.20 mm.) is poured in a glass column (6.5 centimeters ID) and allowed to settle under atmospheric pressure. The preparation containing lincomycin S, described above, is dissolved in absolute methanol. This solution is mixed with silica gel to form a slurry and the mixture dried in vacuo for about 20 hours. The material is added on the top of the silica gel column. Silica gel is then added over this bed and the column is eluted with a solvent system consisting of methyl ethyl ketone:acetone:water (100:30:5).

Fractions containing only lincomycin S are eluted from the column before the other lincomycins. The presence of lincomycin S is determined by thin-layer chromatography, as disclosed above. These fractions which contain only lincomycin S are collected and concentrated to dryness. The residue is dissolved in 1 N methanolic hydrogen chloride at a pH of about 2.0. This solution is again concentrated to dryness. The residue is dissolved in absolute methanol and this solution mixed with ether. While the mixture is being concentrated slowly in a rotating evaporator, a colorless material identified as lincomycin S by thin-layer chromatography crystallizes. These crystals are isolated by filtration and dried. Further crystalline lincomycin S is recovered from the filtrate of the above crystallization by concentrating the filtrate to dryness. The residue is dissolved in absolute methanol and this solution mixed with ethyl ether. The mixture is stirred for about 4 hours. Crystals of lincomycin S which form are isolated by filtration and dried.

*Chemical and physical properties of lincomycin S hydrochloride*

Crystalline lincomycin S hydrochloride has the following physical and chemical properties:

Calcd. for $C_{20}H_{38}N_2O_6S \cdot HCl \cdot H_2O$: C, 49.12; H, 8.47; O, 22.95; N, 5.74; S, 6.57; Cl, 7.27.

Molecular weight.—488.5 (calculated).

Optical rotation.—$[\alpha]_D^{25} = +144.5°$ (c. 0.38, water).

Infrared spectrum.—Lincomycin S hydrochloride shows peaks at the following wave lengths expressed in reciprocal centimeters when run in a KBr disc:

3350 (S), 3060 (M), 2960 (S), 2920 (S), 2865 (M), 2720 (W), 1680 (S), 1562 (S), 1545 (M), 1456 (M), 1392 (M), 1320 (M), 1264 (M), 1210 (W), 1143 (M), 1095 (S), 1077 (S), 1048 (S), 993 (M), 977 (M), 900 (W), 867 (W), 801 (M), 750 (W), 707 (W), 675 (M).

Lincomycin S hydrochloride shows peaks at the following wave lengths expressed in reciprocal centimeters when run in a mineral oil suspension:

3310 (S), 3060 (M), 2950 (S) (oil), 2920 (S) (oil), 2860 (S) (oil), 2850 (S) (oil), 2720 (M), 1683 (S), 1567 (M), 1545 (M), 1460 (S) (oil), 1378 (S) (oil), 1365 (M), 1338 (M), 1300 (M), 1262 (M), 1210 (M), 1142 (M), 1095 (S), 1077 (S), 1049 (S), 991 (M), 997 (M), 900 (W), 867 (M), 801 (M), 713 (M), 675 (M).

Band intensities in the above IR spectra are indicated as "S," "M," and "W," respectively, and are approximated in terms of the backgrounds in the vicinity of the bands. An "S" band is of the same order of intensity as the strongest band in the spectrum; "M" bands are between ⅓ and ⅔ as intense as the strongest band, and "W" bands are less than ⅓ as intense as the strongest band.

Solubility.—Lincomycin S hydrochloride is soluble in water and methanol. It is moderately soluble in 95% ethanol or absolute ethanol and relatively insoluble in acetone, ethyl acetate, chlorinated and saturated hydrocarbon solvents.

*Antibacterial assay procedure*

The antibacterial spectrum for Table I, supra, was determined by using a tube dilution assay procedure with the media being BHI (Brain Heart Infusion Broth, Difco, Detroit, Mich.). Assay tubes (18 x 150 mm.) were prepared in the customary manner as set out in Snell, E. E., Vitamin Methods, vol. I, Academic Press, Inc., New York 1950, p. 327. Test organisms, grown for 18 hours at 37° C., were used to inoculate the test medium. The assays were read at 20 hours.

We claim:

1. Lincomycin S, a compound which has the following structural formula:

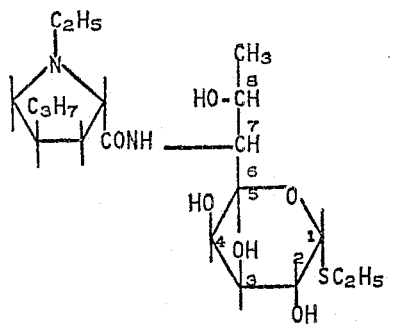

in its essentially pure solid form substantially free from other lincomycins.

2. An acid-addition salt of lincomycin S, as defined in claim 1, in its essentially pure solid form substantially free from other lincomycins.

3. The hydrochloride of lincomycin S, as defined in claim 1, in its essentially pure solid form substantially free from other lincomycins.

4. A compound according to claim 3 in its essentially pure crystalline form substantially free from other lincomycins.

5. A process for producing lincomycin S which comprises cultivating a lincomycin-producing microorganism in an aqueous nutrient medium in the presence of added ethionine in an effective amount, under aerobic conditions until substantial activity is imparted to said medium by the production of lincomycin S and isolating lincomycin S so produced substantially free from other lincomycins.

6. A process for producing lincomycin S which comprises cultivating *Streptomyces lincolnensis* var. *lincolnensis* in an aqueous nutrient medium in the presence of added ethionine in an effective amount, under aerobic conditions until substantial activity is imparted to said medium by the production of lincomycin S and isolating lincomycin S so produced substantially free from other lincomycins.

7. A process according to claim 6 for isolating lincomycin S in its essentially pure form substantially free from other lincomycins which comprises: (a) passing a preparation containing lincomycin S and other lincomycins over a chromatography column; (b) eluting the chromatography column with a solvent system for lincomycin S, and (c) isolating lincomycin S in its essentially pure form substantially free of other lincomycins from the column eluates.

8. A process according to claim 7 wherein a silica gel chromatography column is used.

9. A process according to claim 7 wherein the eluting solvent consists of methyl ethyl ketone:acetone:water in the proportions 100:30:5.

References Cited

UNITED STATES PATENTS

| | | | |
|---|---|---|---|
| 3,086,912 | 4/1963 | Bergy et al. | 260—210 |
| 3,306,892 | 2/1967 | Magerlein | 260—210 |

LEWIS GOTTS, *Primary Examiner.*

JOHNNIE R. BROWN, *Assistant Examiner.*